United States Patent
Klum et al.

(10) Patent No.: US 9,654,140 B1
(45) Date of Patent: May 16, 2017

(54) MULTI-DIMENSIONAL RUN-LENGTH ENCODING

(71) Applicant: Secured2 Corporation, Minneapolis, MN (US)

(72) Inventors: R. Daren Klum, Shoreview, MN (US); Thomas Neafus, Minneapolis, MN (US); Andrew Jeffrey Kluge, Lake Elmo, MN (US); William Paul Kluge, Lake Elmo, MN (US)

(73) Assignee: Scured2 Corporation, Minneapolis, MN (US)

( * ) Notice: Subject to any disclaimer, the term of this patent is extended or adjusted under 35 U.S.C. 154(b) by 0 days.

(21) Appl. No.: 15/249,354

(22) Filed: Aug. 27, 2016

(51) Int. Cl.
*H03M 7/46* (2006.01)
*G06F 21/31* (2013.01)
*G06F 21/62* (2013.01)

(52) U.S. Cl.
CPC .............. *H03M 7/46* (2013.01); *G06F 21/31* (2013.01); *G06F 21/62* (2013.01)

(58) Field of Classification Search
None
See application file for complete search history.

(56) References Cited

U.S. PATENT DOCUMENTS

| | | | | |
|---|---|---|---|---|
| 6,154,542 A * | 11/2000 | Crandall | ................ | H03M 7/30 380/269 |
| 8,040,555 B1 * | 10/2011 | Keithley | ................ | H04N 1/047 347/132 |
| 8,064,599 B2 * | 11/2011 | Little | ................ | H04L 9/34 380/255 |
| 9,319,065 B2 * | 4/2016 | Wirola | ................ | H03M 7/46 |

\* cited by examiner

*Primary Examiner* — Howard Williams
(74) *Attorney, Agent, or Firm* — Hamre, Schumann, Mueller & Larson, P.C.

(57) ABSTRACT

Methods and systems for multi-dimensional run-length encoding of data are provided. In one embodiment, a method for multi-dimensional run-length encoding of an unprocessed data file is provided. The method includes obtaining an admission key and determining a traversal path within a virtual multi-dimensional shape based on the admission key. The method also includes transforming unprocessed data of the unprocessed data file into a plurality of compressed data segments. Also, the method includes plotting the plurality of compressed data segments onto a plurality of data points along the traversal path to obtain a plurality of secured data segments. Further, the method includes generically sorting the plurality of secured data segments to obtain a plurality of generically sorted data segments, and writing the plurality of generically sorted data segments into a processed data file.

24 Claims, 7 Drawing Sheets

MULTI-DIMENSIONAL RUN-LENGTH ENCODING

FIELD

Embodiments of this disclosure relate generally to data compression and security. More specifically, the embodiments relate to a method and system for multi-dimensional run-length encoding of data.

BACKGROUND

As the size of data increases the market is demanding new ways to reduce data size while also securing it. Various methods of compression save companies money by reducing the amount of data stored. This can reduce the costs of hardware purchases and maintenance to maintain this data. However, as data needs expand, companies require access to more data centers or must upgrade the thousands of machines they currently own. On top of rising costs for data storage, companies are plagued with the constant worry of an unauthorized third party illegally gaining access to their secure computer networks which can cost time, resources, customers and ultimately profits.

SUMMARY

Methods and systems for multi-dimensional run-length encoding of data are described.

The embodiments described herein can provide benefits over existing computer technology in that data can be compressed to a smaller size than current compression techniques and also provide enhanced security over the data. The embodiments described herein can also compress data faster than existing compression techniques near the same data compression ratio (i.e., the ratio between an uncompressed data size and a compressed data size). The embodiments described herein can achieve these benefits even when larger sets of data (e.g., petabyte or larger sized data) are to be compressed. Also, the embodiments described herein can be applied to all forms of data files (e.g., document, picture, directory, live/stored audio, live/stored video, user login credentials, system commands, etc.). Thus, the embodiments described herein can reduce data storage requirements for storing data and can provide faster compression times than existing compression techniques.

In some embodiments, data can be compressed using the methods and systems described herein into a format with a ~90% data compression ratio or better. That is, the data can undergo multi-dimensional run-length encoding and the resulting data will take up, at a maximum, 10% of the storage space that the original data requires.

The embodiments described herein can provide compression of a data set using one or more of run-length encoding, data deduplication, and data transformation.

The embodiments described herein can also secure the compressed data by plotting the compressed data along a traversal path within a virtual multi-dimensional shape whereby the traversal path and the virtual multi-dimensional shape are uniquely tied to a particular admission key.

Thus, the embodiments described herein can provide a secure data storage and compression solution that adds security, shrinks file-sizes, and can scale with user requirements.

In one embodiment, a method for multi-dimensional run-length encoding of an unprocessed data file is provided. The method includes obtaining an admission key and determining a traversal path within a virtual multi-dimensional shape based on the admission key. The method also includes transforming unprocessed data of the unprocessed data file into a plurality of compressed data segments. Also, the method includes plotting the plurality of compressed data segments onto a plurality of data points along the traversal path to obtain a plurality of secured data segments. Further, the method includes generically sorting the plurality of secured data segments to obtain a plurality of generically sorted data segments, and writing the plurality of generically sorted data segments into a processed data file.

In another embodiment, a method for restoring a data file that has been processed using multi-dimensional run-length encoding is provided. The method includes obtaining an admission key and reading a plurality of generically sorted data segments that forms a processed data file. The method also includes determining a traversal path within a virtual multi-dimensional shape based on the admission key. Also, the method includes plotting the plurality of generically sorted data segments onto a plurality of data points along the traversal path to obtain a plurality of compressed data segments. Further, the method includes reassembling the plurality of compressed data segments into unprocessed data, and writing the unprocessed data into the data file.

In yet another embodiment, a multi-dimensional run-length encoding system is provided. The system includes a user interface and a multi-dimensional run-length encoding engine. The user interface receives an admission key from a user. The multi-dimensional run-length encoding engine includes a verification unit, a shape generation unit, a shape traversal unit, a data plotting and transformation unit, and a data reading and writing unit. The verification unit verifies the admission key. The shape generation unit determines a virtual multi-dimensional shape equation that is unique to the admission key. The shape traversal unit determines a traversal path within a virtual multi-dimensional shape defined by the virtual multi-dimensional shape equation and that is unique to the admission key. The data plotting and transformation unit transforms unprocessed data into a plurality of compressed data segments and plots each of the plurality of compressed data segments onto a separate data point among a plurality of data points along the traversal path to form a plurality of secured data segments. The data reading and writing unit generically sorts the plurality of secured data segments to form a plurality of generically sorted data segments and writes the plurality of generically sorted data segments into a processed data file.

In yet another embodiment, a multi-dimensional run-length encoding system is provided. The system includes a user interface and a multi-dimensional run-length encoding engine. The user interface receives an admission key from a user. The multi-dimensional run-length encoding engine includes a verification unit, a shape generation unit, a shape traversal unit, a data plotting and transformation unit, and a data reading and writing unit. The verification unit verifies the admission key. The shape generation unit determines a virtual multi-dimensional shape equation that is unique to the admission key. The shape traversal unit determines a traversal path within a virtual multi-dimensional shape defined by the virtual multi-dimensional shape equation and that is unique to the admission key. The data reading and writing unit reads a plurality of generically sorted data segments from a processed data file. The data plotting and transformation unit plots each of the plurality of generically sorted data segments onto a separate data point among a plurality of data points along the traversal path to obtain a plurality of compressed data segments, and reassembles the plurality of compressed data segments to obtain unprocessed data that forms an unprocessed data file.

DETAILED DESCRIPTION

The following description describes methods and systems for multi-dimensional run-length encoding of data.

The embodiments described herein can provide benefits over existing computer technology in that data can be compressed beyond current compression techniques and also provide enhanced security over the data. The embodiments described herein can also compress data faster than existing compression techniques near the same data compression ratio. The embodiments described herein can also scale with larger sets of data (e.g., petabyte or larger sized data). Also, the embodiments described herein can be applied to all forms of data files (e.g., document, picture, directory, live/stored audio, live/stored video, user login credentials, system commands, etc.). Thus, the embodiments described herein can reduce data storage requirements for storing data and can provide faster compression times than existing compression techniques.

In some embodiments, data can be compressed using the methods and systems described herein into a format with a ~90% data compression ratio or better. That is, the data can undergo multi-dimensional run-length encoding and the resulting data will take up, at a maximum, 10% of the storage space that the original data requires.

The embodiments described herein can provide compression of a data set using one or more of run-length encoding, data deduplication, and data transformation.

Multi-dimensional run-length encoding, as defined herein, refers to compressing data using one or more of run-length encoding, data deduplication, and data transformation.

Run-length encoding, as defined herein, refers to a form of lossy or lossless data compression in which sequences of identical data are stored as a data value that has a storage size smaller than the storage size of a single occurrence of the sequence of identical data.

Data deduplication, as defined herein, refers to a form of compression in which second or later occurrences of a sequence of identical data is replaced with a reference pointer that points to a location of the data value representing the sequence of identical data. In some embodiments, the reference pointer can be coordinates of a data point along a traversal path where a data value is located.

Data transformation, as defined herein, refers to a form of transformation in which a mathematical operation is operated on data to transform the data.

The embodiments described herein can also secure the compressed data by plotting the compressed data along a traversal path within a virtual multi-dimensional shape whereby the traversal path and the virtual multi-dimensional shape are uniquely tied to a particular admission key.

A data transformation as defined herein refers to a mathematical operation applied on a data set that converts the data set into a different data set.

Processed data, as defined herein refers, to data that has undergone multi-dimensional run-length encoding as described in the embodiments provided herein. Similarly, a processed file or processed data file, as defined herein, refers to a data file that has undergone dimensional multi-run-length encoding as described in the embodiments provided herein.

Unprocessed data, as defined herein refers, to data that is not processed using multi-dimensional run-length encoding as described in the embodiments provided herein. Similarly, an unprocessed file or unprocessed data file, as defined herein, refers to a data file that is not processed using multi-dimensional run-length encoding as described in the embodiments provided herein.

A virtual multi-dimensional shape, as defined herein, refers to a shape defined by one or more mathematical equations that can be used in multi-dimensional run-length encoding for providing a boundary for a traversal path along which compressed data and/or reference pointer(s) are located.

Generically sorting data or sorting data in a generic format, as defined herein, refers to sorting data in a format that is irrespective of the content of the data and/or the sequence of the data when unprocessed. In some embodiments, generically sorting data can include sorting data based on a coordinate system used for plotting compressed data onto a traversal path. In these embodiments, the generically sorting data can include sorting data in, for example, an ascending coordinate order, a descending coordinate order, etc.

Thus, the embodiments described herein can provide a secure data storage and compression solution that adds security, shrinks file-sizes, and can scale with user requirements.

Figure 1:
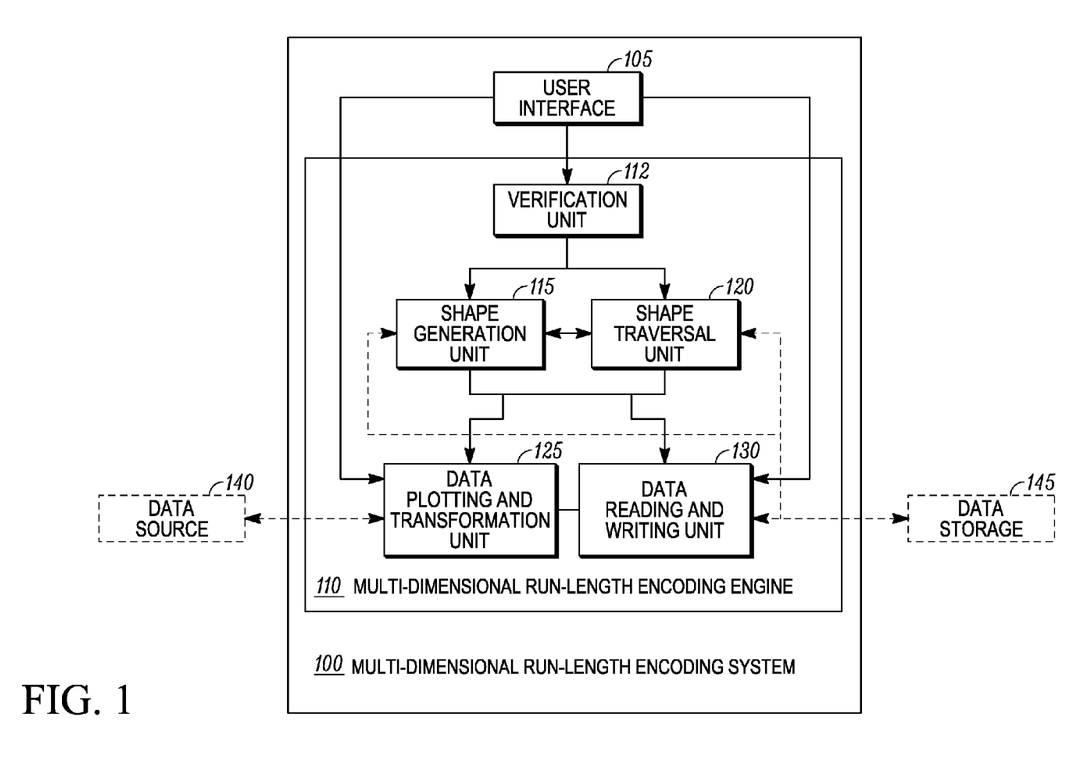
FIG. 1 illustrates a multi-dimensional run-length encoding system 100 according to one embodiment.

FIG. 1 illustrates a multi-dimensional run-length encoding system 100 according to one embodiment. The multi-dimensional run-length encoding system 100 allows data (hereinafter referred to as unprocessed data) to undergo multi-dimensional run-length encoding that compresses and secures the unprocessed data (hereinafter referred to as processed data). The multi-dimensional run-length encoding system 100 includes a user interface 105 and a multi-dimensional run-length encoding engine 110. The multi-dimensional run-length encoding system 100 can be connected to a data source 140 to retrieve unprocessed data for multi-dimensional run-length encoding, and can be connected to a data storage 145 for storing processed data transformed by multi-dimensional run-length encoding.

The user interface 105 is connected to the multi-dimensional run-length encoding engine 110. The user interface 105 allows a user to provide an admission key (e.g., password) and allows a user to modify operation settings of the multi-dimensional run-length encoding engine 110. The user interface 105 can also allow a user to provide unprocessed data to the system 100. Examples of the user interface 105 can include, but are not limited to, a touch screen, a key pad, a voice command recognition system, a fingerprint recognition system, any other type of biometric recognition system, etc.

The multi-dimensional run-length encoding engine 110 includes a verification unit 112, a shape generation unit 115, a shape traversal unit 120, a data plotting and transformation unit 125 and a data reading writing unit 130.

The verification unit 112 is connected to the user interface 105, the shape generation unit 115 and the shape traversal unit 120. The verification unit 112 receives an admission key from the user interface 105. The verification unit 112 determines whether the admission key is recognized and sends instructions to the shape generation unit 115 and the shape traversal unit 120 that can vary based on whether the admission key is recognized or not recognized.

The shape generation unit 115 is connected to the verification unit 112, the shape traversal unit 120, the data plotting and transformation unit 125 and the data reading and writing unit 130. The shape generation unit 115 can also be connected to the data storage 145.

When the admission key is not recognized by the verification unit 112, the shape generation unit 115 generates a virtual multi-dimensional shape equation and any scalers associated with the virtual multi-dimensional shape equation that is tied to the admission key. The shape generation unit 115 sends the generated virtual multi-dimensional shape equation (with any scalers) to the shape traversal unit 120 and/or to the data storage 145 for storage.

When the admission key is recognized by the verification unit 112, the shape generation unit 115 obtains a previously generated virtual multi-dimensional shape equation (with any scalers) that is uniquely associated with the admission key. In some embodiments, the previously generated virtual multi-dimensional shape equation (with any scalers) can be obtained from the data storage 145.

The shape traversal unit 120 is connected to the verification unit 112, the shape generation unit 115, the data plotting and transformation unit 125 and the data reading and writing unit 130. The shape traversal unit 120 can also be connected to the data storage 145.

When the admission key is not recognized by the verification unit 112, the shape traversal unit 120 receives the generated virtual multi-dimensional shape equation (with any scalers) from the shape generation unit 115 or from the data storage 145. The shape traversal unit 120 uses the generated virtual multi-dimensional shape equation (with any scalers) to generate a traversal path that is uniquely associated to the admission key. The shape traversal unit 120 can send the generated traversal path to the data storage 145 for storage.

When the admission key is recognized by the verification unit 112, the shape traversal unit 120 obtains a previously generated traversal path that is uniquely associated with the admission key. In some embodiments, the previously generated traversal path can be obtained from the data storage 145.

The data plotting and transformation unit 125 is connected to the user interface 105, the shape generation unit 115, the shape traversal unit 120 and the data reading and writing unit 130. The data plotting and transformation unit 125 can also be connected to the data source 140. The data plotting and transformation unit 125 receives the virtual multi-dimensional shape equation (with any scalers) from the shape generation unit 115 and receives the traversal path from the shape traversal unit 120.

When an unprocessed data file is to undergo multi-dimensional run-length encoding, the data plotting and transformation unit 125 obtains the unprocessed data file (e.g., from the user interface 105, the data source 140, etc.) and compresses the unprocessed data in the unprocessed data file using one or more of run-length encoding, data deduplication, and data transformation to obtain compressed data file segments. The data plotting and transformation unit 125 then secures the compressed data segments by using the virtual multi-dimensional shape equation (with any scalers) and the traversal path to plot the compressed data segments along the traversal path of the virtual multi-dimensional shape defined by the virtual multi-dimensional shape equation to obtain secured data segments.

When a processed file is to be restored to its original form (e.g., an unprocessed data file), the data plotting and transformation unit 125 uses the virtual multi-dimensional shape equation (with any scalers) and the traversal path uniquely associated to the admission key in order to arrange generically sorted data segments that form the processed file in the proper order to obtain the compressed data segments. That is, the processed file includes the processed data arranged in a generic format (e.g., ascending coordinate order, descending coordinate order, etc.) and the data plotting and transformation unit 125 arranges the generically sorted data segments based on the virtual multi-dimensional shape equation (with any scalers) and the traversal path to obtain the compressed data segments.

The data plotting and transformation unit 125 then decompresses and reassembles the compressed data segments that have undergone one or more of run-length encoding, data deduplication, and data transformation to obtain unprocessed data. The data plotting and transformation unit 125 then forms an unprocessed data file using the unprocessed data. The unprocessed data file can then be provided to the user.

The data reading and writing unit 130 is connected to shape generation unit 115, the shape traversal unit 120, and the data plotting unit 125. The data reading and writing unit 130 can also be connected to the data storage 145.

When an unprocessed data file is to undergo multi-dimensional run-length encoding, the data reading and writing unit 130 obtains the secured data segments from the data plotting and transformation unit 125, sorts the secured data segments into a generic format (e.g., ascending coordinate order, descending coordinate order, etc.) to obtain generically sorted data segments, and then writes the generically sorted data segments to a file to obtain the processed data file. For example, even though the traversal path starts at (0, 0, 0) then goes to (1, 0, 0) and then (0, 1, 0), the data reading and writing unit 130 can generically sort the secured data in ascending order and start at (0, 0, 0) then (0, 1, 0) and then (1, 0, 0).

The data reading and writing unit 130 can then provide the processed data file to, for example, the user interface 105 and/or the data storage 145 for storage.

When a processed file is to be restored to its original form (e.g., an unprocessed data file), the data reading and writing unit 130 obtains the processed data file (e.g., from the user interface 105, the data storage 145, etc.), reads the generically sorted data from the processed data file, and provides the generically sorted data to the data plotting and transformation unit 125.

A method for providing multi-dimensional run-length encoding of an unprocessed data file is discussed below with respect to FIG. 2. A method for restoring a processed data file is discussed below with respect to FIG. 3

Figure 2:
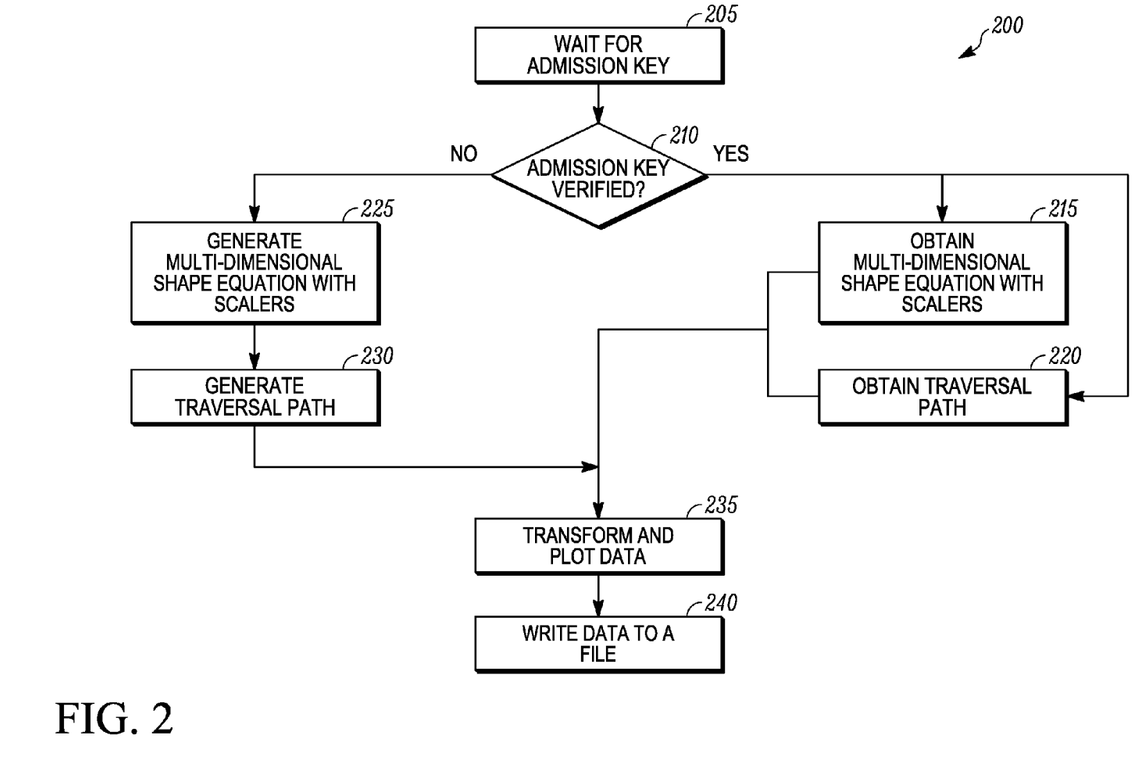
FIG. 2 illustrates a flow chart of a method for multi-dimensional run-length encoding of an unprocessed data file using the system, according to one embodiment.

FIG. 2 illustrates a flow chart of a method 200 for multi-dimensional run-length encoding of an unprocessed data file using the system 100 to obtain a processed data file, according to one embodiment.

The method 200 begins at 205 whereby the user interface 105 waits to receive an admission key from a user. The admission key can be any type of password, biometric authentication, etc. used to authenticate the user. When the user interface 105 receives an admission key, the user interface 105 relays the admission key to the verification unit 112 and the method 200 proceeds to 210.

At 210, the verification unit 112 determines whether the admission key is recognized. If the admission key is recognized, the method 200 proceeds to 215 and 220. In some embodiments, the method 200 can proceed to 215 and 220 concurrently. If the admission key is not recognized, the method 200 proceeds to 225.

At 215, the shape generation unit 115 obtains a previously generated virtual multi-dimensional shape equation (with any scalers) that is uniquely associated with the admission key. In some embodiments, the previously generated virtual multi-dimensional shape equation (with any scalers) can be obtained from the data storage 145.

At 220, the shape traversal unit 120 obtains a previously generated traversal path that is uniquely associated with the admission key. In some embodiments, the previously generated traversal path can be obtained from the data storage 145. Once both the previously generated multi-dimensional run-length encoding equation (with any scalers) and the previously generated traversal path are obtained, the method 200 then proceeds to 235.

At 225, the shape generation unit 115 generates a new virtual multi-dimensional shape equation and any scalers associated with the virtual multi-dimensional shape equation that will be tied to the admission key. In some embodiments, a new virtual multi-dimensional shape equation, including any scalers, can be generated for a new user randomly. In some embodiments, a new virtual multi-dimensional shape equation can be generated for a new user pseudo-randomly, including any scalers, such that the new virtual multi-dimensional shape equation is based on, for example, information provided by the user. The shape generation unit 115 sends the newly generated virtual multi-dimensional shape equation (with any scalers) to the shape traversal unit 120 and/or to the data storage 145 for storage. The method 200 then proceeds to 230.

At 230, the shape traversal unit 120 receives the newly generated virtual multi-dimensional shape equation (with any scalers) from the shape generation unit 115 or from the data storage 145. The shape traversal unit 120 then uses the newly generated virtual multi-dimensional shape equation (with any scalers) to generate a traversal path that is uniquely associated to the admission key. The shape traversal unit 120 can then send the generated traversal path to the data storage 145 for storage. The method 200 then proceeds to 235.

A virtual multi-dimensional shape equation can be any type of mathematical equation that defines a virtual multi-dimensional shape. The virtual multi-dimensional shape equation can be based on any type of coordinate system including, but not limited to, a Cartesian coordinate system, a polar coordinate system, a spherical coordinate system, etc.

Figure 4:
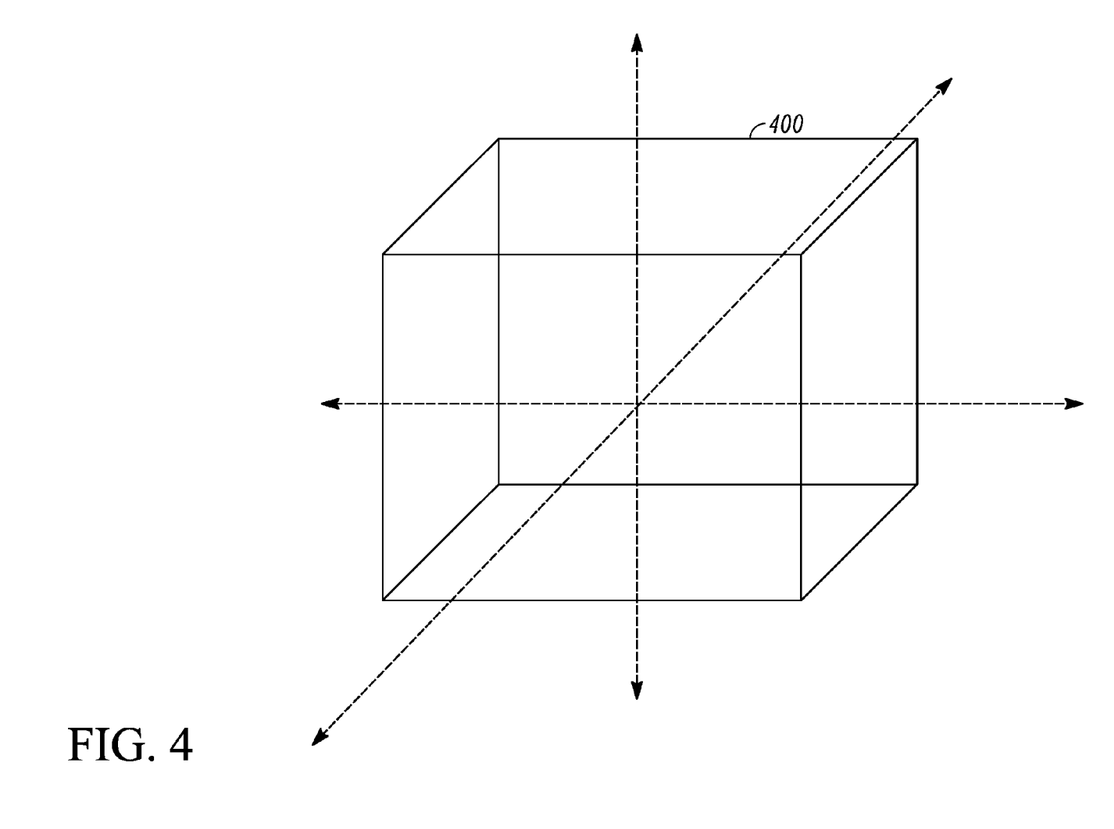
FIG. 4 illustrates a cuboid using a virtual multi-dimensional shape equation, according to one embodiment.

For example, in one embodiment, the virtual multi-dimensional shape equation for a particular admission key can be:

$$D \leq Ax^2 + By^2 + Cz^2$$

where A, B, C and D are scalers of the equation. In this example, the virtual multi-dimensional shape equation is defined using a Cartesian coordinate system and represents a cuboid. FIG. 4 illustrates a cuboid 400 using the virtual multi-dimensional shape equation above. The virtual multi-dimensional shape equation creates a boundary for the traversal path to stay within.

The traversal path can be any pathway within the virtual multi-dimensional shape equation. The shape traversal unit 120 can randomly generate the traversal path within the virtual multi-dimensional shape defined by the virtual multi-dimensional shape equation. Each point along the traversal path represents a position of data. By associating data with each point along the traversal path, the system 100 can determine where data is located when retrieving a data file.

In some embodiments, the shape generation unit 115 and the shape traversal unit 120 can switch between different types of coordinate systems for referring to specific points along the traversal path.

Figure 5A:
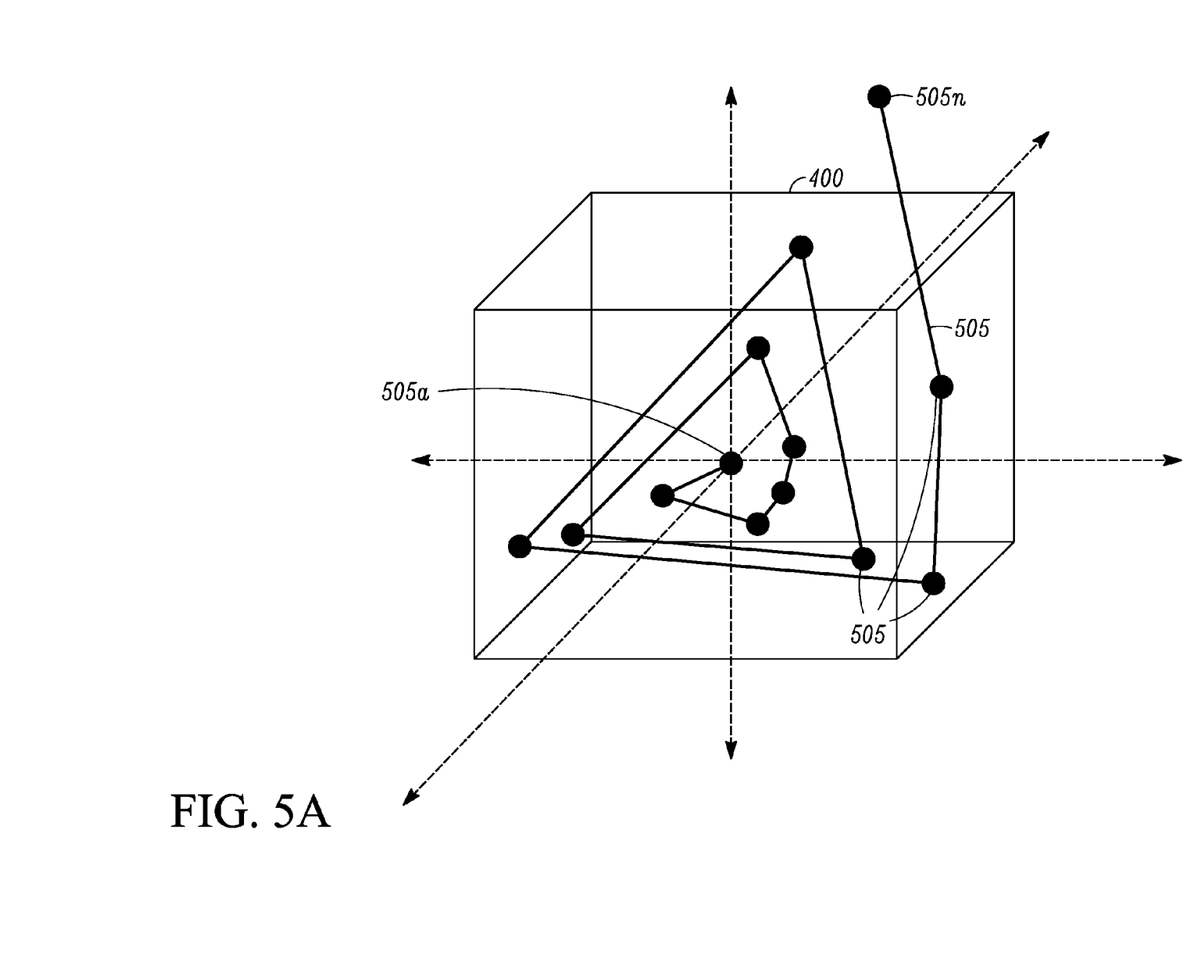
FIG. 5A illustrates a traversal path with a point that extends out of a virtual multi-dimensional shape, according to one embodiment.
Figure 5B:
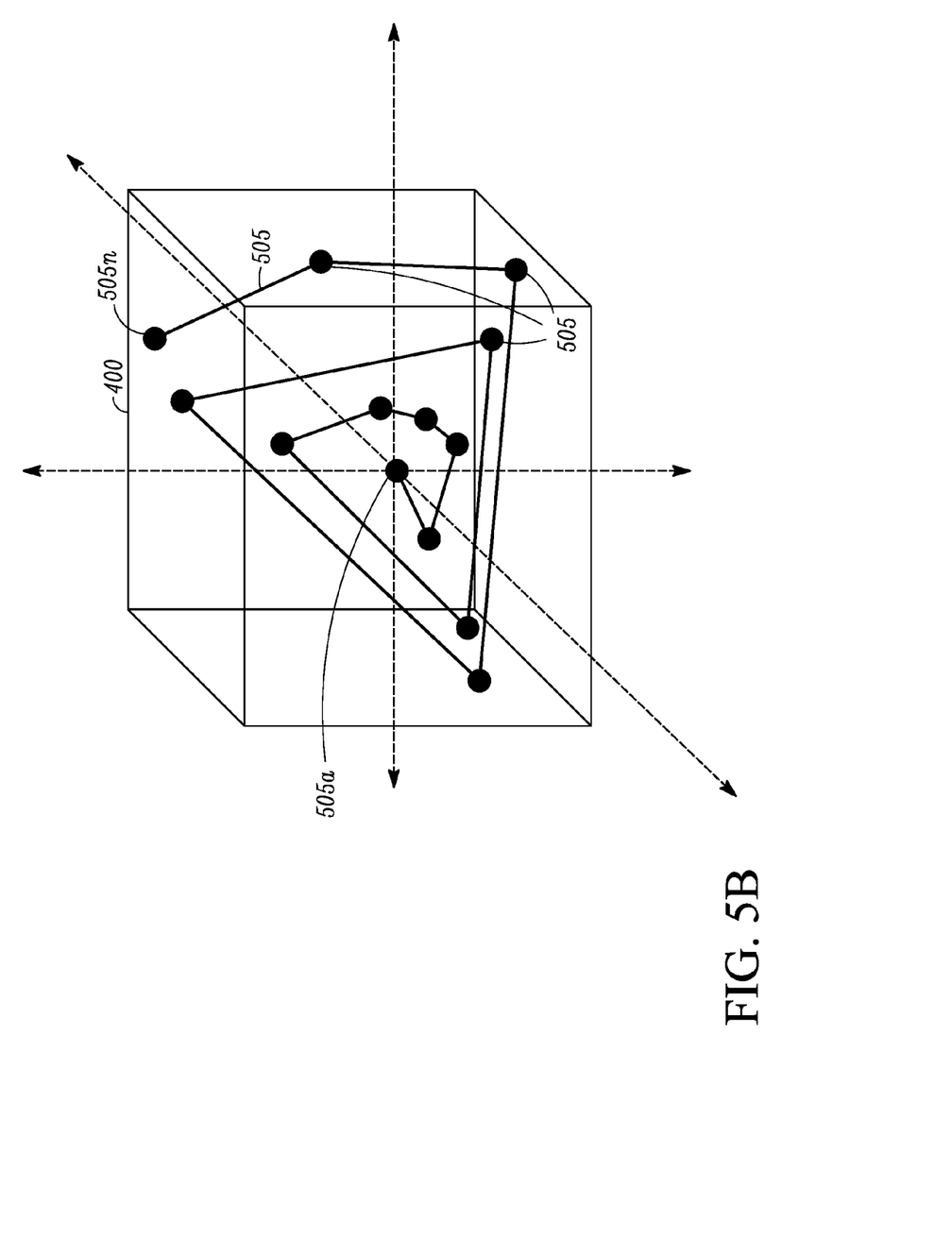
FIG. 5B illustrates a traversal path within a virtual multi-dimensional shape, according to one embodiment.

FIG. 5A illustrates a traversal path 500 with data points 505 with respect to the cuboid 400 shown in FIG. 4. In this embodiment, the traversal path 500 begins at data point 505a (0, 0, 0) (i.e., the center point of the cuboid 400 shown in FIG. 4) and expands out from this point through the virtual multi-dimensional shape. Each data point 505 along the traversal path 500 represents a position for data. As shown in FIG. 5A, data point 505n is outside of the virtual multi-dimensional shape equation (and therefore the cuboid 400). Accordingly, as shown in FIG. 5B, the system 100 relocates the data point 505n of the traversal path 500 such that it is within the boundary defined by the virtual multi-dimensional shape equation. Discussion of plotting data to a traversal path, such as the traversal path 500, is provided below.

At 235, the data plotting and transformation unit 125 transforms and plots the unprocessed data file. Transforming the data includes the data plotting and transformation unit 125 obtaining the unprocessed data file (e.g., from the user interface 105, the data source 140, etc.) and compressing and segmenting the unprocessed data in the unprocessed data file using one or more of run-length encoding, data deduplication, and data transformation to form compressed data segments.

In one embodiment, unprocessed data is compressed and segmented using run-length encoding, data deduplication, and data transformation. These techniques are discussed in detail below. In run-length encoding, the data plotting and transformation unit 125 finds sequences of identical unprocessed data. The sequences of identical unprocessed data are replaced with a data value that has a storage size smaller than the storage size of a single occurrence of the sequence of identical unprocessed data.

For example, if the unprocessed data is made up of bits [10110110111011101 1101111011110110110100100010010], run-length encoding can identify sequences within the data and create data segments for storage. Accordingly, in the above example, run-length encoding can create run-length encoded data segments [3-101], [3-1101], [2-11110], [3-101], [3-0010] from the unprocessed data that can be used for storage.

The run-length encoded data is then further compressed using data deduplication. In data deduplication, the data plotting and transformation unit 125 replaces second or later occurrences of a sequence of identical data with a reference pointer that points to the location of the data value representing the sequence of identical data. In some embodiments, the reference pointer can be coordinates of a data point along a traversal path where a data value is located. The reference pointer has a storage size smaller than the storage size of the data value representing a sequence of identical unprocessed data.

Using the example above, the run-length encoded data segments [3-101], [3-1101], [2-11110], [3-101] can be further compressed to obtain data deduplicated segments [3-101], [3-1101], [2-11110], [A], [3-0010], where A is a reference pointer pointing to the data point along the traversal path where the first compressed data segment [3-101] is located.

Then, the data deduplicated data is further compressed using data transformation. In data transformation, the data plotting and transformation unit 125 identifies sequences of unprocessed data that can be transformed to an already identified sequence of identical unprocessed data using a mathematical operation. These identified sequences of unprocessed data can then be replaced with a reference pointer to the already identified sequence of identical unprocessed data with an operation indicator of the type of mathematical operation used to obtain the original sequence of unprocessed data. The mathematical operation can include, but is not limited to, an inverse operation, a multiplication operation, a division operation, an addition operation, a subtraction operation, an exponential operation, etc.

In the above illustrated example, assuming that the inverse of the data segment [0010] is data segment [1101], data transformation can further compress the data deduplicated data segments [3-101], [3-1101], [2-11110], [A*], [3-0010] to obtain transformed data segments [3-101], [3-1101], [2-11110], [A*], [B$^{-1}$]. Here, A* is a reference pointer pointing to the location along the traversal path of the first compressed data segment [3-101]. Also, B$^{-1}$ indicates a reference pointer pointing to the location along the traversal path of the second compressed data segment [3-1101] and indicates performing an inverse operation on the second compressed data segment [3-1101] to obtain [3-0010]. In some embodiments, the transformed data segments become the compressed data segments that can then be plotted onto a traversal path.

Plotting the data includes the data plotting and transformation unit 125 securing the compressed data segments by using the virtual multi-dimensional shape equation (with any scalers) and the traversal path to plot the compressed data segments along the traversal path of the virtual multi-dimensional shape defined by the virtual multi-dimensional shape equation to obtain secured data segments.

The data plotting and transformation unit 125 plots the compressed data segments (having undergone one or more of run-length encoding, data deduplication, and data transformation) onto the traversal path uniquely associated with the admission key to obtain secured data segments. In one embodiment, the data plotting and transformation unit 125 proceeds through the unprocessed data file in a specified order and sequentially plots each sequence of unprocessed data, reference pointer, and each reference pointer with an operation identifier to a data point along the traversal path.

In some embodiments, multiple instances of the data plotting and transformation unit 125 can compress and segment the unprocessed data and plot the compressed data segments at the same time to increase the speed in which the unprocessed data file undergoes multi-dimensional run-length encoding.

In some embodiments, the traversal path may include extra data points at the end of the traversal path that are not used. In these instances, the data plotting and transformation unit 125 in combination with the data reading and writing unit 130 can remove the extra data points so that they are not written into a processed data file.

Once the data plotting and transformation unit 125 transforms and plots the unprocessed data to obtain secured data segments, the method 200 proceeds to 240.

At 240, the data reading and writing unit 130 obtains the secured data segments from the data plotting and transformation unit 125, sorts the secured data segments into a generic format to obtain generically sorted data segments, and then writes the generically sorted data segments to a file to obtain a processed data file.

In some embodiments, the data plotting and transformation unit 125 can indicate that a data point is to a sequence of unprocessed data by preceding the sequence of unprocessed data with a "0" bit followed by the number of bytes of data in the sequence of unprocessed data. The data plotting and transformation unit 125 can indicate that a data point is to a reference pointer by preceding the reference pointer with a "1" bit. When the data point is to a reference pointer, the "1" bit may not be followed by the number of bytes of data of the reference pointer, as each reference pointer may have the same size.

In some embodiments, the data reading and writing unit 130 can generically sort the secured data segments based on coordinates of the traversal path in which the secured data is stored. That is, the data reading and writing unit 130 can sort the secured data segments in a generic format, for example, in ascending coordinate order, descending coordinate order, etc. In one example, even though the traversal path starts at (0, 0, 0) then goes to (1, 0, 0) and then (0, 1, 0), the data reading and writing unit 130 can sort the secured data in descending order and start at (1, 0, 0) then (0, 1, 0) and then (0, 0, 0).

The data reading and writing unit 130 can then write the generically sorted data segments onto a file to obtain the processed data file. The data reading and writing unit 130 can then provide the processed data file to, for example, the user interface 105 and/or the data storage 145 for storage.

The method 200 described herein can provide a processed data file that can be difficult for a hacker to hack. Even if the hacker had a complete understanding of the method 200, the hacker would not be able to read the processed data file without knowledge of the multi-length run-length encoding shape and the traversal path. Without the traversal path, the hacker would be required to decode every data point in which data is stored and try to combine with every other data point. In order to decode each data point the hacker would be required to find the coordinate values for each of the data points which would be difficult without knowledge of the traversal path.

The method 200 can also provide a processed data file that is significantly smaller than the original unprocessed file. In some embodiments, the unprocessed data file can be compressed into a processed data file format with a ~90% data compression ratio or better.

Figure 3:
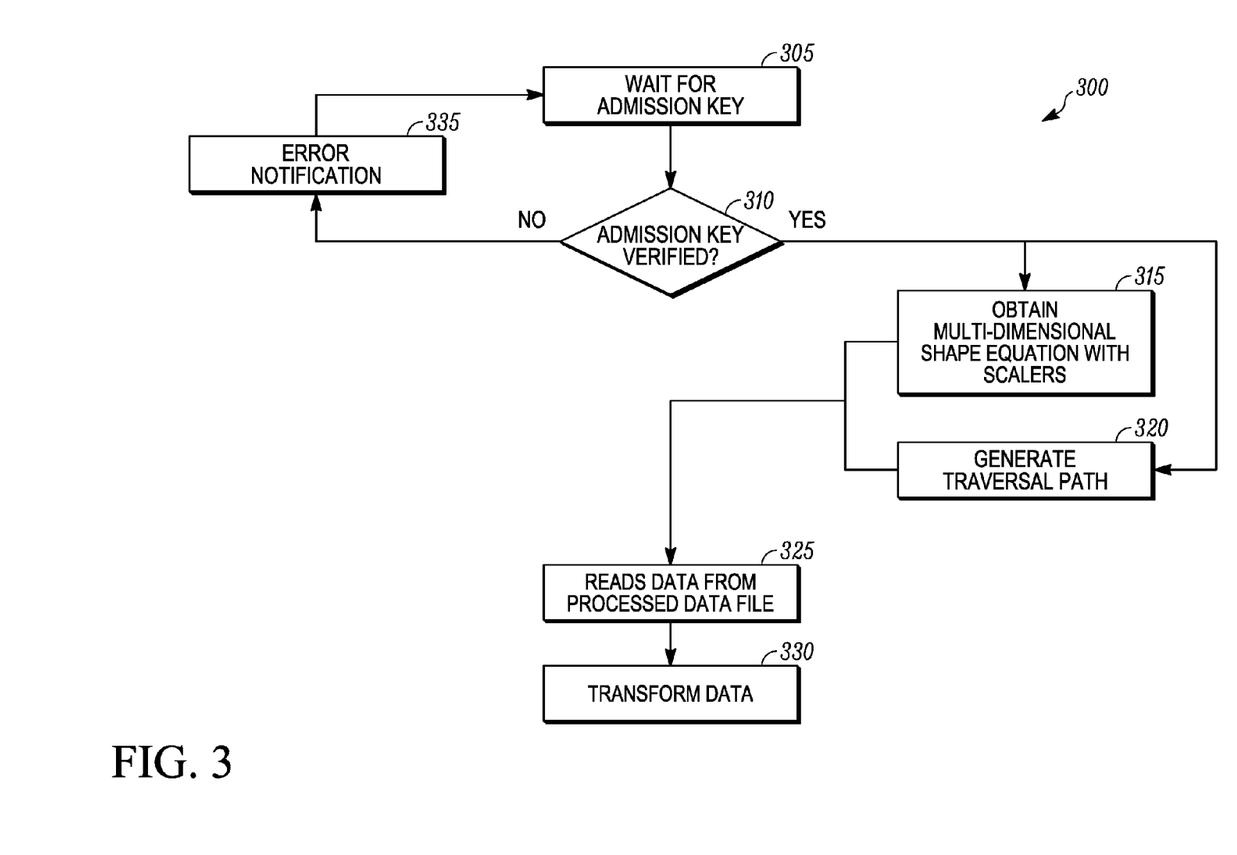
FIG. 3 illustrates a flow chart of a method for restoring an unprocessed data file that has been processed using multi-dimensional run-length encoding using the system 100, according to one embodiment.

FIG. 3 illustrates a flow chart of a method 300 for restoring an unprocessed data file that has been processed using multi-dimensional run-length encoding using the system 100, according to one embodiment.

The method 300 begins at 305 whereby the user interface 105 waits to receive an admission key from a user. The admission key can be any type of password, biometric authentication, etc. used to authenticate the user. When the user interface 105 receives an admission key, the user interface 105 relays the admission key to the verification unit 112 and the method 300 proceeds to 310.

At 310, the verification unit 112 determines whether the admission key is recognized. If the admission key is recognized, the method 300 proceeds to 315 and 320. In some embodiments, the method 300 proceeds to 315 and 320 concurrently. If the admission key is not recognized, the method 200 proceeds to 335.

At 335, the verification unit 112 notifies the user that the admission key is not recognized and requests the user to provide the correct admission key.

At 315, the shape generation unit 115 obtains a previously generated virtual multi-dimensional shape equation (with any scalers) that is uniquely associated with the admission key. In some embodiments, the previously generated virtual multi-dimensional shape equation (with any scalers) can be obtained from the data storage 145.

At 320, the shape traversal unit 120 obtains a previously generated traversal path that is uniquely associated with the admission key. In some embodiments, the previously generated traversal path can be obtained from the data storage 145. Once both the previously generated multi-dimensional run-length encoding equation (with any scalers) and the previously generated traversal path are obtained, the method 300 then proceeds to 325.

At 325, the data reading and writing unit 130 obtains the processed data file (e.g., from the user interface 105, the data storage 145, etc.), reads the generically sorted data segments from the processed data file, and provides the generically sorted data segments to the data plotting and transformation unit 125. The method 300 then proceeds to 330.

At 330, the data plotting and transformation unit 125 uses the previously generated virtual multi-dimensional shape equation (with any scalers) and the traversal path that are uniquely associated to the admission key in order to arrange the generically sorted data segments in the proper order to obtain the compressed data segments, and decompresses the compressed data segments that have undergone one or more of run-length encoding, data deduplication, and data transformation to obtain the unprocessed data that can be formed into the unprocessed file. In particular, the data plotting and transformation unit 125 can arrange the generically sorted data segments at their respective data points. The data plotting and transformation unit 125 can then reassemble the compressed data segments and write the uncompressed data in the order of the traversal path to obtain the unprocessed data file.

In some embodiments, the data plotting and transformation unit 125 can reassemble the unprocessed data file at multiple different data points along the traversal path at the same time. When a particular data point includes a reference pointer that points to a data point that has not yet been reassembled, the data plotting and transformation unit 125 can move onto a different data point along the traversal path and come back to this data point later. This can increase the speed in which the unprocessed data file can be restored.

Once all of the compressed data segments are reassembled into the unprocessed data file, the unprocessed data file can then be provided to the user.

Figure 6:
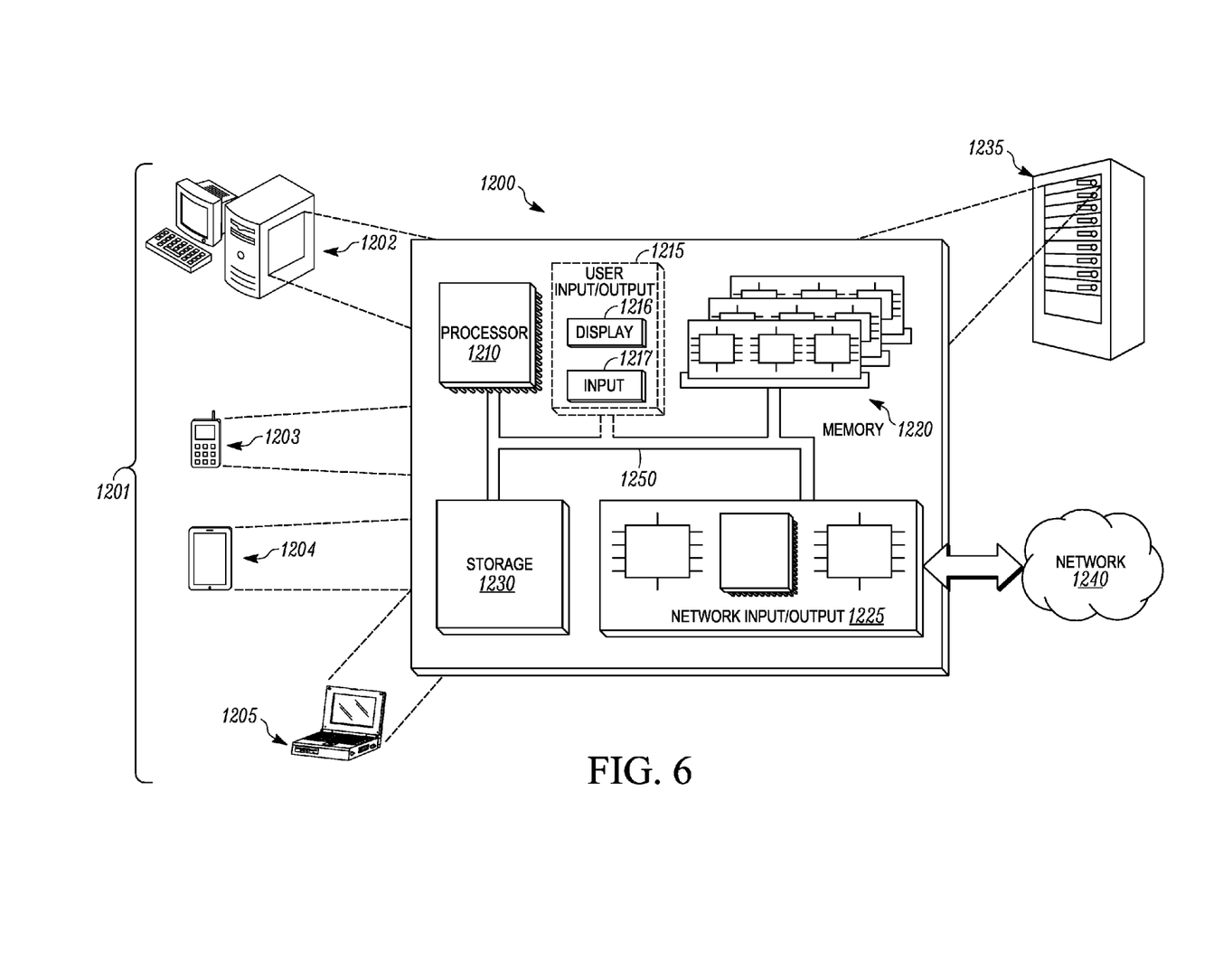
FIG. 6 schematically depicts an architecture of a computing device and computing system optionally used in connection with computer-implemented systems and methods described in this document.

FIG. 6 is a schematic diagram of an exemplary architecture for a computer device 1200, such as the one or more computer devices described above with respect to FIGS. 1-5.

The computer device 1200 and any of the individual components thereof can be used for any of the operations described in accordance with any of the computer-implemented systems and methods described herein.

The computer device 1200 generally includes a processor 1210, memory 1220, a network input/output (I/O) 1225, storage 1230, and an interconnect 1250. The computer device 1200 can optionally include a user I/O 1215, according to some embodiments. The computer device 1200 can be in communication with one or more additional computer devices 1200 through a network 1240.

The computer device 1200 is generally representative of hardware aspects of a variety of user devices 1201 and a server device 1235. The illustrated user devices 1201 are exemplary and are not intended to be limiting. Examples of the user devices 1201 include, but are not limited to, a desktop computer 1202, a cellular/mobile phone 1203, a tablet device 1204, and a laptop computer 1205. It is to be appreciated that the user devices 1201 can include other devices such as, but not limited to, a personal digital assistant (PDA), a video game console, a television, or the like. In some embodiments, the user devices 1201 can alternatively be referred to as client modules 1201. In such embodiments, the client modules 1201 can be in communication with the server device 1235 through the network 1240. One or more of the client modules 1201 can be in communication with another of the client modules 1201 through the network 1240 in some embodiments.

The processor 1210 can retrieve and execute programming instructions stored in the memory 1220 and/or the storage 1230. The processor 1210 can also store and retrieve application data residing in the memory 1220. The interconnect 1250 is used to transmit programming instructions and/or application data between the processor 1210, the user I/O 1215, the memory 1220, the storage 1230, and the network I/O 1225. The interconnect 1250 can, for example, be one or more busses or the like. The processor 1210 can be a single processor, multiple processors, or a single processor having multiple processing cores. In some embodiments, the processor 1210 can be a single-threaded processor. In some embodiments, the processor 1210 can be a multi-threaded processor.

The user I/O 1215 can include a display 1216 and/or an input 1217, according to some embodiments. It is to be appreciated that the user I/O 1215 can be one or more devices connected in communication with the computer device 1200 that is physically separate from the computer device 1200. For example, the display 1216 and input 1217 for the desktop computer 1202 can be connected in communication but be physically separate from the computer device 1200. In some embodiments, the display 1216 and input 1217 can be physically included with the computer device 1200 for the desktop computer 1202. In some embodiments, the user I/O 1215 can physically be part of the user device 1201. For example, the cellular/mobile phone 1203, the tablet device 1204, and the laptop 1205 include the display 1216 and input 1217 that are part of the computer device 1200. The server device 1235 generally may not include the user I/O 1215. In some embodiments, the server device 1235 can be connected to the display 1216 and input 1217.

The display 1216 can include any of a variety of display devices suitable for displaying information to the user. Examples of devices suitable for the display 1216 include, but are not limited to, a cathode ray tube (CRT) monitor, a liquid crystal display (LCD) monitor, a light emitting diode (LED) monitor, or the like.

The input 1217 can include any of a variety of input devices or means suitable for receiving an input from the user. Examples of devices suitable for the input 1217 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 1217 can be included for the user devices 1201. In some embodiments the input 1217 can be integrated with the display 1216 such that both input and output are performed by the display 1216.

The memory 1220 is generally included to be representative of a random access memory such as, but not limited to, Static Random Access Memory (SRAM), Dynamic Random Access Memory (DRAM), or Flash. In some embodiments, the memory 1220 can be a volatile memory. In some embodiments, the memory 1220 can be a non-volatile memory. In some embodiments, at least a portion of the memory can be virtual memory.

The storage 1230 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 1230 is a computer readable medium. In some embodiments, the storage 1230 can include storage that is external to the computer device 1200, such as in a cloud.

The network I/O 1225 is configured to transmit data via a network 1240. The network 1240 may alternatively be referred to as the communications network 1240. Examples of the network 1240 include, but are not limited to, a local area network (LAN), a wide area network (WAN), the Internet, or the like. In some embodiments, the network I/O 1225 can transmit data via the network 1240 through a wireless connection using WiFi, Bluetooth, or other similar wireless communication protocols. In some embodiments, the computer device 1200 can transmit data via the network 1240 through a cellular, 3G, 4G, or other wireless protocol. In some embodiments, the network I/O 1225 can transmit data via a wire line, an optical fiber cable, or the like. It is to be appreciated that the network I/O 1225 can communicate through the network 1240 through suitable combinations of the preceding wired and wireless communication methods.

The server device 1235 is generally representative of a computer device 1200 that can, for example, respond to requests received via the network 1240 to provide, for example, data for rendering a website on the user devices 1201. The server device 1235 can be representative of a data server, an application server, an Internet server, or the like.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method for multi-dimensional run-length encoding of an unprocessed data file, the method comprising:
   obtaining an admission key;
   determining a traversal path within a virtual multi-dimensional shape based on the admission key;
   transforming unprocessed data of the unprocessed data file into a plurality of compressed data segments;
   plotting each of the plurality of compressed data segments onto a data point along the traversal path to obtain a plurality of secured data segments;
   generically sorting the secured data segments to obtain a plurality of generically sorted data segments; and
   writing the plurality of generically sorted data segments into a processed data file.

2. The method of claim 1, wherein determining the traversal path within the virtual multi-dimensional shape based on the admission key includes:
   verifying the admission key;
   generating a virtual multi-dimensional shape equation defining the virtual multi-dimensional shape that is unique to the admission key when the admission key is not verified; and
   generating the traversal path within the virtual multi-dimensional shape that is unique to the admission key when the admission key is not verified.

3. The method of claim 2, wherein the virtual multi-dimensional shape equation includes a scaler that is unique to the admission key.

4. The method of claim 1, wherein determining the traversal path within the virtual multi-dimensional shape based on the admission key includes:
   verifying the admission key;
   obtaining from a storage location a virtual multi-dimensional shape equation defining the virtual multi-dimensional shape that is unique to the admission key when the admission key is verified; and
   obtaining from the storage location the traversal path within the virtual multi-dimensional shape that is unique to the admission key when the admission key is verified.

5. The method of claim 4, wherein the virtual multi-dimensional shape equation includes a scaler that is unique to the admission key.

6. The method of claim 1, wherein transforming the unprocessed data of the unprocessed data file into the plurality of compressed data segments includes identifying a first sequence of unprocessed data and a second sequence of unprocessed data that is identical to the first sequence of unprocessed data, replacing the first and second sequences of unprocessed data with a data value that has a storage size that is smaller than the storage size of each of the first and second sequences of unprocessed data, and
   wherein the data value is a first compressed data segment of the plurality compressed data segments and the data value is a second compressed data segment of the plurality of compressed data segments.

7. The method of claim 1, wherein transforming the unprocessed data of the unprocessed data file into the plurality of compressed data segments includes identifying a first sequence of unprocessed data and a second sequence of unprocessed data that is identical to the first sequence of unprocessed data, replacing the first sequence of unprocessed data with a data value that has a storage size that is smaller than the storage size of the first and second sequences of unprocessed data, and replacing the second sequence of unprocessed data with a reference pointer that points to a data point of the data value, wherein the reference pointer has a storage size that is smaller than the storage size of each of the first and second sequences of unprocessed data, and
   wherein the data value is a first compressed data segment of the plurality of compressed data segments and the reference pointer is a second compressed data segment of the plurality of compressed data segments.

8. The method of claim 1, wherein transforming the unprocessed data of the unprocessed data file into the plurality of compressed data segments includes identifying a first sequence of unprocessed data and a second sequence of unprocessed data that when applying a mathematical operation on the second sequence of unprocessed data transforms the second sequence of unprocessed data into a new sequence of unprocessed data that is identical to the first sequence of unprocessed data, replacing the first sequence of unprocessed data with a data value that has a storage size that is smaller than the storage size of each of the first and second sequences of unprocessed data, and replacing the second sequence of unprocessed data with a reference pointer that points to the data value and an operation indicator indicating the mathematical operation applied to the second sequence of unprocessed data to obtain the first sequence of unprocessed data,
   wherein the data value is a first compressed data segment of the plurality of compressed data segments, and
   wherein the reference pointer and the operation indicator is a second compressed data segment of the plurality of compressed data segments.

9. A method for restoring a data file that has been processed using multi-dimensional run-length encoding, the method comprising:
   obtaining an admission key;
   reading a plurality of generically sorted data segments that forms a processed data file;
   determining a traversal path within a virtual multi-dimensional shape based on the admission key;
   plotting the plurality of generically sorted data segments onto a plurality of data points along the traversal path to obtain a plurality of compressed data segments;
   reassembling the plurality of compressed data segments into unprocessed data that forms the data file.

10. The method of claim 9, wherein determining the traversal path within the virtual multi-dimensional shape based on the admission key includes:
    verifying the admission key;
    obtaining from a storage location a virtual multi-dimensional shape equation defining the virtual multi-dimensional shape that is unique to the admission key when the admission key is verified; and
    obtaining from the storage location the traversal path within the virtual multi-dimensional shape that is unique to the admission key when the admission key is verified.

11. The method of claim 10, wherein the virtual multi-dimensional shape equation includes a scaler that is unique to the admission key.

12. The method of claim 9, wherein reassembling the plurality of compressed data segments into the unprocessed data includes:
    reading at a data point of the plurality of data points a data value representing a sequence of unprocessed data; and
    replacing the data value with the sequence of unprocessed data.

13. The method of claim 9, wherein reassembling the plurality of compressed data segments into the unprocessed data includes:
    reading at a first data point of the plurality of data points a reference pointer that points to a second data point of the plurality of data points providing a first instance of a first compressed data segment of the plurality of compressed data segments; and
    replacing the reference pointer with the first compressed data segment.

14. The method of claim 9, wherein reassembling the plurality of compressed data segments into the unprocessed data includes:
    reading at a first data point of the plurality of data points a reference pointer that points to a second data point of the plurality of data points providing a first instance of a first compressed data segment of the plurality of compressed data segments;
    reading at the first data point an operation indicator representing a mathematical operation;
    replacing the reference pointer with the first compressed data segment; and
    applying the mathematical operation onto a sequence of unprocessed data represented by the first compressed data segment.

15. A multi-dimensional run-length encoding system comprising:

a user interface that receives an admission key from a user; and a multi-dimensional run-length encoding engine that includes:

a verification unit that verifies the admission key, a shape generation unit that determines a virtual multi-dimensional shape equation that is unique to the admission key, a shape traversal unit that determines a traversal path within a virtual multi-dimensional shape defined by the virtual multi-dimensional shape equation and that is unique to the admission key, a data plotting and transformation unit that transforms unprocessed data into a plurality of compressed data segments and plots each of the plurality of compressed data segments onto a separate data point among a plurality of data points along the traversal path to form a plurality of secured data segments, and a data reading and writing unit that generically sorts the plurality of secured data segments to form a plurality of generically sorted data segments and writes the plurality of generically sorted data segments into a processed data file.

16. The multi-dimensional run-length encoding system of claim 15, wherein the virtual multi-dimensional shape equation includes a scaler that is unique to the admission key.

17. The multi-dimensional run-length encoding system of claim 15, wherein the data plotting and transformation unit identifies a first sequence of unprocessed data and a second sequence of unprocessed data that is identical to the first sequence of unprocessed data, and replaces the first and second sequences of unprocessed data with a data value that has a storage size that is smaller than the storage size of each of the first and second sequences of unprocessed data, and wherein the data value is a first compressed data segment of the plurality compressed data segments and the data value is a second compressed data segment of the plurality of compressed data segments.

18. The multi-dimensional run-length encoding system of claim 15, wherein the data plotting and transformation unit identifies a first sequence of unprocessed data and a second sequence of unprocessed data that is identical to the first sequence of unprocessed data, and replaces the first sequence of unprocessed data with a data value and replaces the second sequence of unprocessed data with a reference pointer that points to the data value, wherein the reference pointer has a storage size that is smaller than the storage size of each of the first and second sequences of unprocessed data, and wherein the data value is a first compressed data segment of the plurality of compressed data segments and the reference pointer is a second compressed data segment of the plurality of compressed data segments.

19. The multi-dimensional run-length encoding system of claim 15, wherein the data plotting and transformation unit identifies a first sequence of unprocessed data and a second sequence of unprocessed data that when applying a mathematical operation on the second sequence of unprocessed data transforms the second sequence of unprocessed data into a new sequence of unprocessed data that is identical to the first sequence of unprocessed data, and replaces the first sequence of unprocessed data with a data value and replaces the second sequence of unprocessed data with a reference pointer that points to the data value and an operation indicator indicating the mathematical operation applied to the second sequence of unprocessed data to obtain the first sequence of unprocessed data, wherein the data value is a first compressed data segment of the plurality of compressed data segments, and wherein the reference pointer and the operation indicator is a second compressed data segment of the plurality of compressed data segments.

20. A multi-dimensional run-length encoding system comprising:

a user interface that receives an admission key from a user; and a multi-dimensional run-length encoding engine that includes:

a verification unit that verifies the admission key, a shape generation unit that determines a virtual multi-dimensional shape equation that is unique to the admission key, a shape traversal unit that determines a traversal path within a virtual multi-dimensional shape defined by the virtual multi-dimensional shape equation and that is unique to the admission key, a data reading and writing unit that reads a plurality of generically sorted data segments from a processed data file, and a data plotting and transformation unit that plots each of the plurality of generically sorted data segments onto a separate data point among a plurality data points along the traversal path to obtain a plurality of compressed data segments, and reassembles the plurality of compressed data segments to obtain unprocessed data that forms an unprocessed data file.

21. The multi-dimensional run-length encoding system of claim 20, wherein the virtual multi-dimensional shape equation includes a scaler that is unique to the admission key.

22. The multi-dimensional run-length encoding system of claim 20, wherein the data plotting and transformation unit reads at a data point of the plurality of data points a data value representing a sequence of unprocessed data, and replaces the data value with the sequence of unprocessed data.

23. The multi-dimensional run-length encoding system of claim 20, wherein the data plotting and transformation unit reads at a first data point of the plurality of data points a reference pointer that points to a second data point of the plurality of data points that provides a first instance of a first compressed data segment of the plurality of compressed data segments, and replaces the reference pointer with the first compressed data segment.

24. The multi-dimensional run-length encoding system of claim 20, wherein the data plotting and transformation unit reads at a first data point of the plurality of data points a reference pointer that points to a second data point of the plurality of data points that provides a first instance of a first compressed data segment of the plurality of compressed data segments, reads at the first data point an operation indicator representing a mathematical operation, replaces the reference pointer with the first compressed data segment, and applies the mathematical operation onto a sequence of unprocessed data represented by the first compressed data segment.

* * * * *